US012749388B2

(12) United States Patent
Bradley et al.

(10) Patent No.: US 12,749,388 B2
(45) Date of Patent: Sep. 29, 2026

(54) ENSURING UN-MASKABLE DETECTION OF DEGRADED SIGNALS

(71) Applicant: ORACLE INTERNATIONAL CORPORATION, Redwood Shores, CA (US)

(72) Inventors: Kirk Bradley, San Francisco, CA (US); Ruixian Liu, Shijiazhuang (CN); Kenny C. Gross, Escondido, CA (US)

(73) Assignee: Oracle International Corporation, Redwood Shores, CA (US)

(*) Notice: Subject to any disclaimer, the term of this patent is extended or adjusted under 35 U.S.C. 154(b) by 0 days.

(21) Appl. No.: 18/816,194

(22) Filed: Aug. 27, 2024

(65) Prior Publication Data

US 2026/0065768 A1 Mar. 5, 2026

(51) Int. Cl.
*G08B 21/18* (2006.01)

(52) U.S. Cl.
CPC .................................. *G08B 21/182* (2013.01)

(58) Field of Classification Search
CPC .................................................... G08B 21/182
USPC ......................................................... 340/657
See application file for complete search history.

(56) References Cited

U.S. PATENT DOCUMENTS 5,402,521 A * 3/1995 Niida ....................... G06N 3/09 702/183
5,764,509 A * 6/1998 Gross ................. G05B 23/0254 706/45
7,292,952 B1 * 11/2007 Gross .................. G06F 11/3096 702/182
7,616,109 B2 * 11/2009 McCulloch .......... G08B 29/046 340/657
9,234,769 B2 * 1/2016 Yun .......................... G01D 1/18
11,163,747 B2 * 11/2021 Shahand ............. G06F 11/3409
11,415,975 B2 * 8/2022 Huang ................. G06N 3/0499
2006/0047482 A1 * 3/2006 Yuan .................. G05B 23/0221 702/185
2009/0167336 A1 * 7/2009 La Rosa ............ G01R 31/2858 324/762.05
2014/0188777 A1 * 7/2014 Yan .......................... G06N 5/04 706/50
2020/0226902 A1 * 7/2020 Mandaric ................ G06F 9/445
2020/0293527 A1 * 9/2020 Srivastav .............. G06F 16/285
2021/0191378 A1 * 6/2021 Amores .................. G06F 16/11
2021/0365784 A1 * 11/2021 Huang ................... G06N 3/063
2023/0061280 A1 * 3/2023 Rohrkemper .......... G06N 20/00

(Continued)

*Primary Examiner* — Zhen Y Wu
(74) *Attorney, Agent, or Firm* — Kraguljac Law Group LLC

(57) ABSTRACT

Systems, methods, and other embodiments associated with ensuring that detection of degraded signals is not able to be masked by degradation in other signals are described. In one example embodiment, a method accesses a multivariate machine learning model that is trained to monitor a set of time series signals and a test observation of the signals has a degradation on an m-th signal. A baseline bias for the m-th signal is determined using the test observation and a model-estimated value of the m-th signal. A Jacobian matrix of the model is generated based on a finite difference smaller than an observed value of the m-th signal. A masking bias is determined based on the baseline bias and a next K largest entries of an m-th row of the Jacobian matrix. And, the degradation is certified to be un-maskable or not based on the masking bias and the finite difference.

20 Claims, 4 Drawing Sheets

(56) References Cited

U.S. PATENT DOCUMENTS

| | | | | |
|---|---|---|---|---|
| 2023/0081821 | A1 * | 3/2023 | Batistakis | G03F 7/70483 382/145 |
| 2023/0367847 | A1 * | 11/2023 | Prieditis | G16H 50/30 |
| 2024/0054348 | A1 * | 2/2024 | Fu | G06N 3/08 |

* cited by examiner

ENSURING UN-MASKABLE DETECTION OF DEGRADED SIGNALS

BACKGROUND

One form of "propagation of uncertainty" (POU) analysis is to determine whether real degradation in one signal could potentially be masked by combined degradations in other signals. Amenability to such masking analysis enables artificial intelligence/machine learning (AI/ML) applications to engineering and transportation assets that can have high-liability consequences (such as loss of human life) from undetected anomaly alarms. The absence of masking analysis capability has already been cited by the United States Food and Drug Administration for disallowing Neural Networks (NNs) for life-critical procedures. Rigorous POU analyses of NNs are mathematically intractable because NNs employ stochastic optimization of weights.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Figure 1:
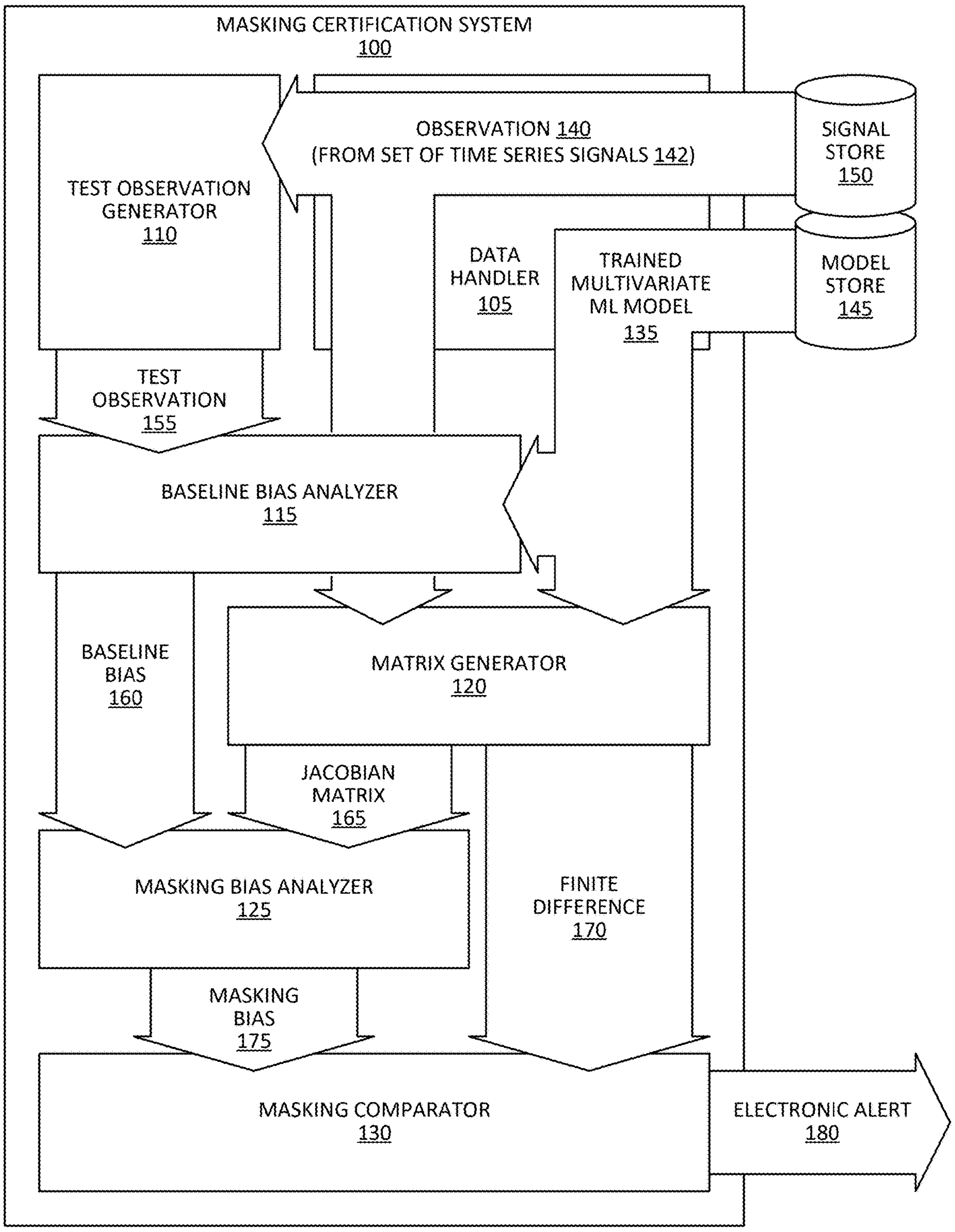
FIG. 1 illustrates one embodiment of a masking certification system that is associated with ensuring that detection of degraded signals is not able to be masked by degradation in other signals.

Systems, methods, and other embodiments are described herein that provide for ensuring that detection of degraded signals is not able to be masked by degradation in other signals, as may be highly beneficial, for example, in safety-critical sensor networks. In one embodiment, a masking certification system tests multivariate sensor signal collections to determine whether or not it is possible that degradation in one signal can be masked in machine learning (ML) anomaly detection by combined degradations in other signals. For example, the masking certification system performs a propagation of uncertainty (POU) analysis to either (i) prove that there are no conditions in which a dangerous condition could exist but the alarms for that condition could be masked, or (ii) detect the conditions under which alarms for a dangerous condition could be masked.

In a major improvement over existing POU analyses, the certification (that a degradation on a signal is unmaskable to an alarm condition of an ML model by concurrent degradations on other signal inputs to the ML model) is mathematically demonstrable and/or provable.

In one embodiment, the masking certification system creates a test observation that deliberately includes a degradation on one signal. The test observation is used in a POU analysis of a trained multivariate ML (MML) model to test whether the degradation—which would ordinarily trigger an alarm condition of the trained MML model—is potentially maskable by degradations on other signal inputs, or is un-maskable. The POU analysis generates a matrix of partial derivatives for the MML estimate of the one signal with respect to the other N−1 signals, then determines a top few of the partial derivatives that represent the top few inputs to the MML model that are most influential on the estimate, and determines whether a cumulative bias added to the top few inputs that is sufficient to obscure the degradation on the one signal is also smaller than a finite distance perturbation used to create the matrix. If not, the POU analysis certifies the one signal to be un-maskable to the alarm condition of the trained MML model.

Definitions

As used herein, the term multivariate ML model (MML) refers to a type of ML model designed to analyze a plurality of contemporaneous input variables to produce one or more output estimates based on learned relationships between the inputs and outputs.

As used herein with reference to time series signals or values thereof, the terms "degraded" or "degradation" refers to signal values that are deviant or anomalous, due to sensed abnormal conditions of a monitored asset, to calibration drift of a sensor, sensor failure, noisy sensor readings, and the like.

As used herein, the term "mask" or "masking" refers to rendering a degraded signal potentially undetectable by an MML model due to degradation in other signals monitored by the MML model.

As used herein, the term "un-maskable" refers to a state or condition of a MML model in which it is not possible to mask degraded signals in one time series signal monitored by the model by degradation in other signals monitored by the model.

As used herein, the term "asset" or "engineering asset" refers to a physical system, structure, device, machine, appliance, apparatus, or other physical construct; or a component or part thereof. Assets may include, for example, manufacturing equipment, engines, server computers, buildings, vehicles, and a wide variety of other physical constructs that that generate and/or are affected by physical phenomena.

As used herein, the terms "time series" and "time series signal" refer to a data structure in which a series of data points or readings (such as observed or sampled values) are indexed in time order. For convenience, a time series signal may be referred to herein simply as a "signal". In one embodiment, the data points of a time series may be indexed with an index such as a time stamp and/or an observation number. A time series may be considered one "column" or sequence of observations over time from one of N variables (such as from one sensor of an aircraft engine, server computer, vehicle, manufacturing facility, or other asset).

As used herein, the term "vector" refers to a data structure that includes a set of concurrent data points or readings (such as observed or sampled values) from multiple time series at one particular point in time, such as a point in time described by a shared time stamp, observation number, or other index. A vector may therefore be considered one "row" of observations from all N variables (such as from multiple (or all) sensors of an aircraft engine, server computer, vehicle, manufacturing facility, or other asset). A vector may also be referred to herein as a "multivariate observation" or "observation" for short.

As used herein, the term "time series database" or "set of time series signals" refers to a data structure that includes a set of more than one time series that share an index (such as a series of points in time, time stamps, time steps, or observation numbers) in common. From another perspective, the term "time series database" refers to a data structure that includes vectors or multivariate observations across multiple time series at a series of points in time. In other words, the time series database is a time series of vectors. As an example, time series may be considered "columns" of a time series database, and vectors or multivariate observations may be considered "rows" of a time series database.

As used herein, the term "residual" refers to a difference or error between a value and an estimate, reference, or prediction of what the value is expected to be. In one embodiment, the residual may be an unsigned magnitude of the difference, also referred to as an "absolute error." For example, a residual may be a difference between an observed value and a prediction or estimate by a MML model of what the value is expected to be. The difference referred to is a mathematical difference, i.e., a value obtained by subtraction between estimated and actual values. In one embodiment, a time series of residuals or "residual time series" refers to a time series made up of residual values between a time series of values and a time series of what the values are expected to be.

No action or function described or claimed herein is performed by the human mind. An interpretation that any action or function can be performed in the human mind is inconsistent with and contrary to this disclosure.

—Example Masking Certification System—

FIG. 1 illustrates one embodiment of a masking certification system 100 that is associated with ensuring that detection of degraded signals is not able to be masked by degradation in other signals. Masking certification system 100 includes components for (i) detecting that signal degradation can be masked in a MML model and/or (ii) certifying that degradation is un-maskable for one or more (or all) signals in the MML model. More simply, masking certification system 100 includes components that are configured to determine whether or not degradation (such as anomaly) in a signal can be concealed or obscured in the MML model due to degradation in other signals. For example, components of masking certification system 100 are configured to assess the mask-ability of a degradation of a given signal in a trained MML model based on magnitude of a masking bias derived from a Jacobian matrix of the trained MML model and a baseline bias for the given signal derived from an estimate by the trained MML model of a test observation that includes the degradation. In one embodiment, masking certification system 100 includes a data handler 105, a test observation generator 110, a baseline bias analyzer 115, a matrix generator 120, a masking bias analyzer 125, and a masking comparator 130. In one embodiment, the components of masking certification system 100 intercommunicate to provide data or results to one another, for example by electronic messages as discussed below under the heading "Cloud or Enterprise Embodiments".

In one embodiment, data handler 105 is configured to access a trained multivariate machine learning model 135 that is trained to monitor a set of time series signals 142. In one embodiment, data handler 105 is configured to establish a connection to a model store 145 (a database that is configured to store and serve trained MML models), compose and execute a query to model store 145 that specifies retrieval of the trained MML model 135, fetch the trained MML model 135 returned by the model store 145, and provide the trained MML model 135 to baseline bias analyzer 115 and/or matrix generator 120. In one embodiment, data handler 105 is configured to establish a connection to signal store 150 (a database that is configured to store and serve time series signals), compose and execute a query to signal store 150 that specifies retrieval of one observation 140 of the set of time series signals 142, fetch the observation returned by signal store 150, and provide the observation to the test observation generator 110 and to matrix generator 120.

In one embodiment, test observation generator 110 is configured to generate a test observation 155 of the set of time series signals 142 that includes a degradation on an m-th signal of the time series signals. In one embodiment, m is an index, for example between 1 and M, for M signals in the set of time series signals 142. In one embodiment, test observation generator 110 is configured to access a pre-specified value for the degradation that is a maximum acceptable amount of degradation for the m-th signal, for example by retrieving the pre-specified value from a designated location in storage. And, test observation generator 110 is configured to add the pre-specified value to an observed value that is observed for the m-th signal in the one observation 140 of the time series signals 142 to generate the test observation 155. Test observation generator 110 is configured to provide the test observation 155 to baseline bias analyzer 115. In one embodiment, test observation 155 is pre-generated by test observation generator 110 and placed in storage, and one or more of data handler 105 and test observation generator 110 are configured to access test observation 155 from storage and provide test observation 155 to baseline bias analyzer 115.

In one embodiment, baseline bias analyzer 115 is configured to determine a baseline bias 160 of the trained MML model 135 for the m-th signal. Baseline bias analyzer 115 is configured to make the determination based on the test observation 155 and an estimated value of the m-th signal that was produced by the trained MML model 135. For example, baseline bias analyzer 115 is configured to execute trained MML model 135 with the values of test observation 155 provided as inputs to the trained MML model 135 to generate the estimated value of the m-th signal as an output. And, baseline bias analyzer 115 is configured to generate a residual between (i) the value for the m-th signal of the test observation that includes the degradation and (ii) the estimated value of the m-th signal output by the trained MML model. Baseline bias analyzer 115 is configured to provide the residual as the value of baseline bias 160 to masking bias analyzer 125.

In one embodiment, matrix generator 120 is configured to generate a Jacobian matrix 165 of the trained MML model 135. Matrix generator 120 is configured to generate the Jacobian matrix 165 based on a finite difference 170 (or perturbation). In one embodiment, the finite difference 170 is smaller in magnitude than an observed value of the m-th signal (from observation 140).

In one embodiment, masking bias analyzer 125 is configured to determine a masking bias 175. Masking bias analyzer 125 is configured to determine the masking bias 175 based on the baseline bias 160 and a next K largest entries of an m-th row of the Jacobian matrix 165. The next K largest entries of the m-th row are the entries of the m-th row that are greatest in magnitude after the entry for the m-th signal itself, which appears in the m-th row at the m-th column. The next K largest entries thus exclude and do not include the entry for the m-th signal in the m-th row of the Jacobian matrix 165.

In one embodiment, masking comparator 130 is configured to certify the degradation in the m-th signal to be potentially maskable where the comparison shows the masking bias 175 not to exceed the finite difference 170. And, masking comparator 130 is configured to certify the degradation in the m-th signal to be un-maskable where the comparison shows the finite difference 170 to be smaller than the masking bias 175. For example, masking comparator 130 is configured to generate an electronic alert 180 that certifies whether or not the degradation in the m-th signal is un-maskable based on the comparison between the masking bias 175 and the finite difference 170.

Further details regarding masking certification system 100 are presented herein. In one embodiment, operations of masking certification system 100 will be described with reference to example masking certification method 200 of FIG. 2 and example masking certification method 300 of FIG. 3.

—Example Masking Certification Method—

Figure 2:
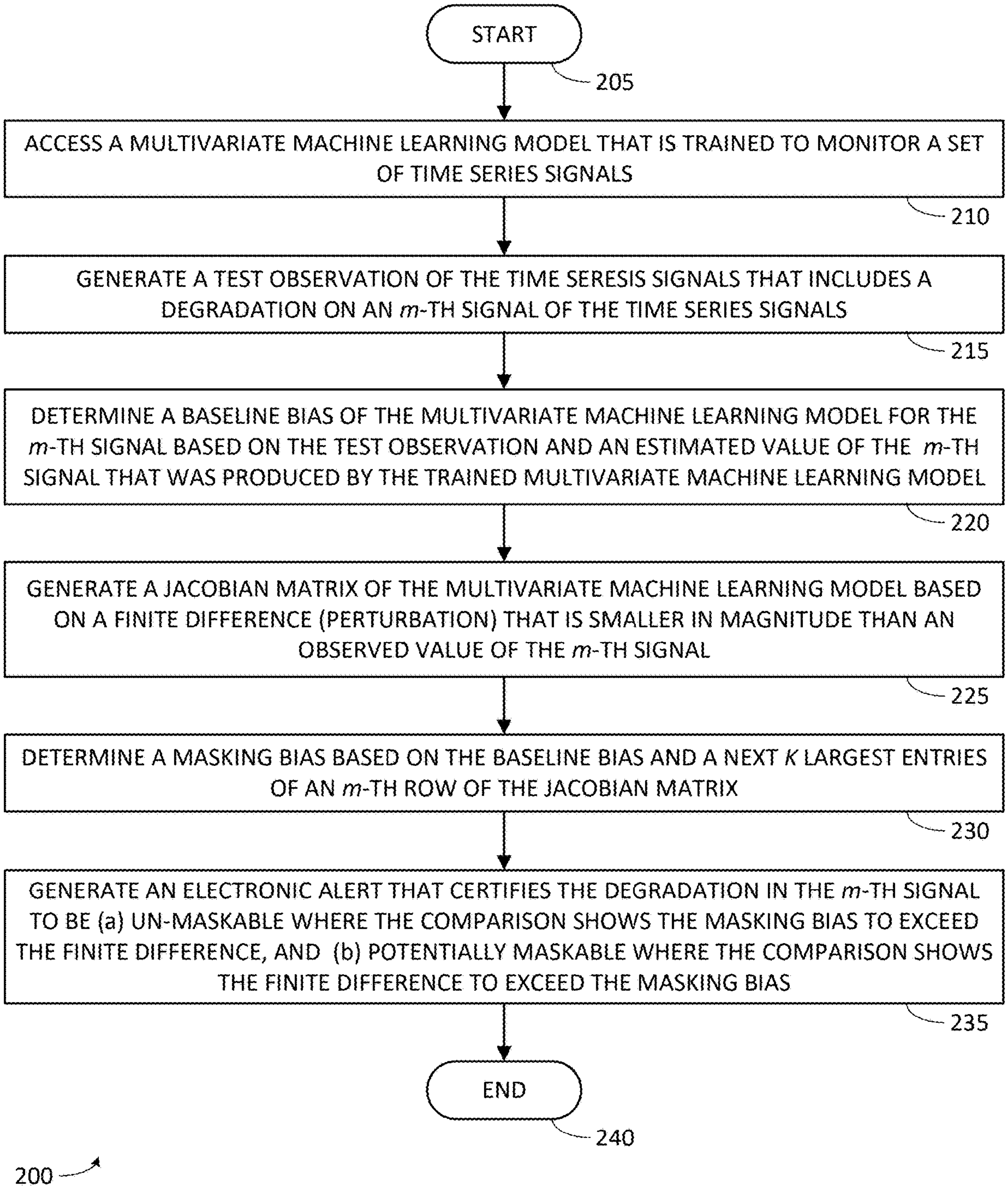
FIG. 2 illustrates one embodiment of a masking certification method that is associated with ensuring that detection of degraded signals is not able to be masked by degradation in other signals.

FIG. 2 illustrates one embodiment of a masking certification method 200 that is associated with ensuring that detection of degraded signals is not able to be masked by degradation in other signals. Masking certification method 200 is one example process by which degraded signals may be (i) certified to be un-maskable for a given MML model, or (ii) found to be potentially maskable by degradation on other inputs to the MML model.

In one embodiment, as a general overview, masking certification method 200 accesses a MML model that is pre-trained to monitor a multi-signal time series database; generates a test observation that has a known bias added to an m-th signal of the time series database (as discussed at block 215); determines a baseline bias in the trained MML model caused by the degraded signal (as discussed at block 220); derives a Jacobian matrix for the trained MML that highlights significant inputs of the trained MML model at a given finite difference (perturbation) amount (as discussed at block 225); calculates a masking bias from the baseline bias and a top few (K) most significant inputs identified in the Jacobian matrix (as discussed at block 230); certifies degradation in the m-th signal as either potentially maskable or un-maskable in the trained MML based on comparison between the given finite difference and the masking bias (as discussed at block 235); and issues an electronic notification regarding the mask-ability of the degradation in the trained MML (also as discussed at block 235). When masking bias exceeds finite difference, degradation is unmaskable. Conversely, when finite difference exceeds the making bias, degradation is potentially maskable.

In one embodiment, masking certification method 200 initiates at START block 205 in response to masking certification system 100 determining one or more of (1) that masking certification system 100 has been instructed to analyze an MML to determine whether degradation on one signal can be masked by degradation on other signals; (2) that an instruction to perform masking certification method 200 has been received; (3) a user or administrator has initiated masking certification method 200; (4) it is currently a time at which masking certification method 200 is scheduled to be run; (5) a trained MML model has been received for mask-ability analysis by masking certification system 100; or (6) masking certification method 200 should commence in response to satisfaction of some other condition. As used herein, the use of the term "in response to" an event indicates that an action or task is automatically initiated, carried out, completed, or otherwise performed automatically upon the occurrence of the event.

In one embodiment, a computing system configured by computer-executable instructions to execute functions of masking certification system 100 executes masking certification method 200. In one embodiment, masking certification method 200 (i) configures the computing system with system settings, software dependencies and libraries, and modules for the components of masking certification system 100; (ii) connects to data sources (such as databases, data stores, file systems, and cloud storage) and fetches datasets used by the masking certification method 200, such as pre-trained MML models, observations from time series databases, pre-set degradation values, and configuration parameters used by masking certification method 200; and (iii) allocates and initializes resources used by masking certification method 200, such as processor, memory, storage, and network connections. Following initiation at START block 205, masking certification method 200 proceeds to block 210.

At block 210, masking certification method 200 accesses a multivariate machine learning model that is trained to monitor a set of time series signals. For example, masking certification method 200 obtains or retrieves data describing the trained MML model, such as a serialized data object that encapsulates architecture, learned relationships between input and output variables, and/or other parameters of the trained MML model. In one embodiment, the trained MML model is accessed by executing a query that reads a specified trained MML model on the model store that includes the trained MML model.

And, in one embodiment, masking certification method 200 also accesses the set of time series signals. For example, masking certification method 200 obtains or retrieves one or more observation vectors from the set of time series signals. For example, where there are M signals in the set of time series signals, masking certification method 200 retrieves an observation vector $x \in \mathbb{R}^M$ from the set of M time series signals monitored by the trained MML model at a specific time stamp (or time point) t. In one embodiment, the observation vectors are accessed by executing a query that specifies a time stamp for an observation to be retrieved on the signal store that includes the set of times series signals. In various embodiments the observation may be selected by random time stamp, pre-specified time stamp, dequeued or popped to obtain a "next available" observation, or chosen from a designated subset of observations such as observations designated for training or testing.

In one embodiment, block 210 accepts as inputs (i) parameters for connecting to data sources (such as model store and signal store), and (ii) identifiers for a particular trained MML model and set (database) of time series signals for which the MML model is trained. Using these inputs, block 210 obtains vectors of observations from the set of time series signals and a trained MML model, and makes them available to downstream processes.

In one embodiment, the steps of block 210 are performed by data handler 105. At the conclusion of block 210, masking certification method 200 has produced as outputs (i) a trained MML model, which will be used by baseline bias analyzer 115 to generate a value of baseline bias and by matrix generator 120 to generate partial derivative values of outputs of the trained MML model with respect to inputs; and (ii) one or more observation vectors of the set of time series signals, which will be used by test observation generator 110 to construct one or more test observations. Processing continues to block 215.

At block 215, masking certification method 200 generates a test observation of the time series signals. The test observation includes a degradation on an m-th signal of the time series signals. For example, masking certification method 200 obtains an observation vector for one time index from the set of time series signals, and then deliberately introduces a degradation (or fault) on a value for an m-th signal in the observation vector, thereby forming a test observation. In one embodiment, the degradation is added to the observed value for the m-th signal in order to produce a degraded test observation for use in generating the baseline bias. The degradation superimposes a step change of a particular, pre-determined value onto the value for the m-th signal in the test observation(s), and not onto values of other signals in the test observation(s).

The value of m, and the value of the degradation may be pre-determined. In one embodiment, masking certification method 200 applies a same value of degradation consistently to multiple or all signals (i.e., for multiple or all values of m). In one embodiment, the value of the degradation may vary based on the particular signal under consideration. Masking certification method 200 may therefore look up the value of the degradation corresponding to the value of m, for example in a lookup table indexed by values of m.

In one embodiment, the values of the signals in the set of time series signals are normalized or standardized to a mean-centered unit variance, causing the individual signals to each be scaled to have a mean of zero and a standard deviation of one, enhancing comparability by removing scale differences. The value of the degradation may be, for example, specified as a fraction or percentage of the unit. In one embodiment, it may be desirable to test whether the m-th signal is susceptible to large amounts of masking in the trained MML model. For example, degradations of up to 100% of the unit value or may be added to the m-th signal. Also, in one embodiment, it may be desirable to test whether the m-th signal is susceptible to even small amounts of masking in the trained MML model. For example, in safety-critical systems, degradations beyond 5-10%, or even under 1%, can be cause for serious concern, and accordingly, in one example the degradation added to the m-th signal has a magnitude in the range of 10% of the unit value or less. In general, the masking certification method 200 operates to determine whether the specified value of degradation on the m-th signal can or cannot be masked by degradations on other signals. In one embodiment, the degradation is a maximum amount of degradation that is deemed to be acceptable for the m-th signal.

In one embodiment, to generate the test observation of the set of time series signals with a degradation on the m-th signal, masking certification method 200 first obtains the observation vector x provided by data handler 105. Then, masking certification method 200 identifies the pre-determined degradation value d for the m-th signal from a storage location or lookup table. Masking certification method 200 adds this degradation d to the observed value of the m-th signal in the observation vector x to form a new degraded test observation x'=x+d, where d is a vector with d in the m-th position and zeros elsewhere.

In one embodiment, the steps of block 215 are performed by test observation generator 110. At the conclusion of block 215, masking certification method 200 has provided a test observation x' that includes a degradation of known extent in one signal, which will be used by baseline bias analyzer 115 to generate a value of baseline bias. Processing continues to block 220.

At block 220, masking certification method 200 determines a baseline bias of the multivariate machine learning model for the m-th signal. The baseline bias is determined based on the test observation and an estimated value of the m-th signal that was produced by the trained multivariate machine learning model. In one embodiment, the masking certification method 200 finds a residual between the degraded value for the m-th signal and an estimated value for the m-th signal generated from the test observation by the trained MML model. The resulting residual is then used as the baseline bias (bias0) exhibited for the degraded m-th signal by the trained MML model. The baseline bias (bias0) is a reference value indicating the amount of influence on the m-th that would need to be overcome or drowned out by other degradations on other signals in order to mask the degradation on the m-th signal.

In one embodiment, in order to determine the baseline bias, masking certification method 200 first loads the trained MML model 135 provided by data handler 105. Masking certification method 200 then inputs the test observation (which includes the deliberate degradation d on the value for the m-th signal $x_m$) into the trained MML model. Masking certification method 200 executes the trained MML model on the test observation to produce estimated values for the test observation, including an estimated value for the m-th signal, $e_{bm}$. Masking certification method 200 then calculates the baseline bias bias0 by finding the residual between the degraded value of the moth signal $x'_m=x_m+d$ and the estimated value produced by the model $e_{bm}$ by subtracting the estimated value produced by the model $e_{bm}$ from the sum of the value for the m-th signal $x_m$ and the degradation d, ($bias0=x_m+d-e_{bm}$). Masking certification method 200 then provides the resulting baseline bias to masking bias analyzer for further analysis.

In one embodiment, the steps of block 220 are performed by baseline bias analyzer 115. At the conclusion of block 220, masking certification method 200 has produced a baseline bias (bias0) that may be used by the masking bias analyzer to determine a masking bias (bias). Processing continues to block 225.

At block 225, masking certification method 200 generates a Jacobian matrix of the multivariate machine learning model. The Jacobian matrix is generated based on a finite difference. In one embodiment, the finite difference is smaller in magnitude than an observed value of the m-th signal (without the added degradation). For example, masking certification method 200 adjusts each input signal by the finite difference, runs the modified inputs through the trained MML model, and calculates how the outputs change (i.e., the partial derivatives with respect to each input signal) to construct the Jacobian matrix.

In one embodiment, in order to generate the Jacobian matrix of the trained MML model, masking certification method 200 first loads the trained MML model 135 and the original, un-degraded observation vector 140 ($x \in \mathbb{R}^M$) provided by data handler 105. For each input signal value $x_i$ in the observation vector 140 masking certification method 200 perturbs the signal value by adding a small finite difference FDsize. (Here, finite difference FDsize is, at least initially, smaller than the observed value of the m-th signal, to allow FDsize to be increased over multiple iterations as discussed below.) Masking certification method 200 then generates the perturbed observation vector $x_i^+=x+FDsize \times e_i$, where $e_i$ is a unit vector with 1 in the i-th position and 0 elsewhere. Masking certification method 200 then inputs the perturbed observation vector $x_i^+$ into the trained MML model. Masking certification method 200 executes the trained MML model on the perturbed observation vector $x_i^+$ to produce a perturbed estimate vector $e_b^+$ as output. And, masking certification method 200 also inputs the original observation vector 140 x into the trained MML model and executes the model to produce an un-perturbed estimated vector $e_a$ as output. Masking certification method 200 computes a difference between the perturbed estimate vector $e_b^+$ and the un-perturbed estimated vector $e_a$ and computes the quotient of the computed difference divided by the finite difference FDsize in order to approximate the partial derivatives:

$$\partial e/\partial x_i \approx (e_b^+ - e_a)/FDsize.$$

Masking certification method 200 repeats the foregoing process for all the input signal value $x_i$ to construct the full Jacobian matrix $J \in \mathbb{R}^{M \times M}$. The Jacobian matrix describes the sensitivity of the output (such as for the m-th signal) of the trained MML to changes of size FDsize in each input signal. The Jacobian matrix may then be used to identify a subset of K signals (other than the m-th signal) that have a strongest influences on estimates for the m-th signal, as discussed below in block 230.

In one embodiment, the steps of block 225 are performed by matrix generator 120. At the conclusion of block 225, masking certification method 200 has generated a Jacobian matrix that shows the sensitivity of the outputs of the trained MML model to changes in the inputs, which may be used by masking bias analyzer 125 to determine a masking bias. Also, masking certification method 200 has made available a current value of finite difference FDsize to masking comparator 130 for use in determining whether the degradation on the m-th signal is potentially maskable in the trained MML model. Processing continues to block 230.

At block 230, masking certification method 200 determines a masking bias. The masking bias is determined based on the baseline bias and a next K largest entries of an m-th row of the Jacobian matrix. By analyzing the entries in the Jacobian matrix, especially the m-th row corresponding to the degraded m-th signal, masking certification method 200 can determine the potential impact of other signals on the m-th signal. In one embodiment, masking certification method 200 calculates the cumulative bias values for the K most influential other signals—as indicated by the K largest Jacobian entries in the m-th row—to determine the masking bias. Thus, to derive masking bias from the Jacobian matrix, masking certification method 200 finds the ratio of the baseline bias to the sum of the next K largest magnitudes in the m-th row of the Jacobian matrix, ignoring the m-th element.

In one embodiment, the masking bias is derived from Taylor series expansion approximation of the influence of the K most influential other signals on the m-th signal. As discussed below, the Taylor series expansion approximation of the m-th row of the Jacobian matrix serves to linearize the non-linear relationship between the inputs to the trained MML model, and the output estimate of the m-th signal.

In one embodiment, to determine the masking bias, masking certification method 200 identifies the m-th row of the Jacobian matrix. Masking certification method 200 excludes or ignores the entry corresponding to the m-th column. Masking certification method 200 sorts the remaining entries by magnitude. Masking certification method 200 selects the top K largest of the remaining entries. Masking certification method 200 records the column indices of the K largest of the remaining entries in a set IndicesK. Masking certification method 200 computes a cumulative sum of the K largest entries, for example by retrieving the value in the m-th row of the Jacobian matrix at each of the column indices in IndicesK and adding them in a running tally. Masking certification method 200 then calculates the masking bias bias by dividing the baseline bias bias0 by the cumulative sum of the top K entries selected from the m-th row of the Jacobian matrix.

Thus, in one embodiment, masking bias is a sum of values in a vector of K component biases for the next K largest entries. The masking bias is thus a sum of K entries as normalized by bias0. These individual component biases may be stored once calculated, retained, and subsequently retrieved and included in an electronic alert that indicates the degradation to be potentially maskable (as discussed below at block 235). In the alert, component biases may be shown in association with their corresponding signal identifiers, thereby indicating in the alert the conditions on the K other signals under which the degradation on the m-th signal may be masked.

In one embodiment, the steps of block 230 are performed by masking bias analyzer. At the conclusion of block 230, masking certification method 200 has produced a masking bias that quantifies the potential for other signals to mask the degradation in the m-th signal, and which, when compared with the finite difference by masking comparator 130, may determine whether the degradation is maskable or not. Processing continues to block 235.

At block 235, masking certification method 200 generates an electronic alert that certifies whether or not the degradation in the m-th signal is un-maskable. The certification is based on a comparison between the masking bias and the finite difference. For example, masking certification method 200 compares the masking bias and a finite difference used to generate the Jacobian matrix. Then, masking certification method 200 certifies the degradation in the m-th signal to be (a) un-maskable where the comparison shows the masking bias to exceed the finite difference, and (b) potentially maskable where the comparison shows the finite difference to exceed the masking bias.

In one embodiment, masking certification method 200 retrieves the masking bias bias and the finite difference FDsize. Masking certification method 200 populates the condition 'if masking bias is greater than finite difference' ('bias>FDsize') with the values for masking bias and finite difference. Masking certification method 200 then executes a logical comparison operation to evaluate the condition. Where the condition evaluates to FALSE, certify the degradation in the m-th signal as potentially maskable. Where the condition evaluates to TRUE, certify the degradation as unmaskable (at least for the current value of finite difference FDsize).

As discussed below with reference to FIG. 3, the finite difference FDsize is incremented by a step FDstep and the masking certification method 200 repeated from generation of the Jacobian matrix for the incremented finite difference until the finite difference reaches or exceeds a cutoff threshold, such as a maximum size FDmax. Once the cutoff threshold is reached without the degradation being found to be potentially maskable at any of the increments of finite difference, the degradation is no longer just conditionally unmaskable for the current value of finite difference, but is determined to be entirely unmaskable in the trained MML model.

Once the certification as potentially maskable or unmaskable is completed, masking certification method 200 generates an electronic alert. In one embodiment, the electronic alert is generated by composing and transmitting a computer-readable message including content describing the certification status of the trained MML model. In one embodiment, masking certification method 200 accesses a template electronic alert message from memory or storage. Masking certification method 200 then populates the content of the electronic alert message. The message may include a certification statement that a degradation on the m-th signal (and/or one or more other signals) is either potentially maskable or unmaskable in the trained MML model. The message may state the size of degradation. The message may state a unique identifier of the trained MML model. The message may indicate the signals covered by the certification. Where the degradation is potentially maskable, the message may include an indication of the other signals that can potentially mask the degradation, and, for example, state bias values on the other signals.

Once the electronic alert message is composed, masking certification method 200 transmits the electronic alert message for subsequent presentation on a display, or for other action. The electronic alert may be configured to be presented by display in a graphical user interface (GUI).

In one embodiment, the steps of block 235 are performed by masking comparator 130. At the conclusion of block 235, masking certification method 200 proceeds to end block 240 where masking certification method 200 concludes. Masking certification method 200 has decided whether or not the trained MML model is susceptible to masking of degradation on a given signal. Masking certification method 200 improves on prior POU analyses by providing verifiable certification that a trained MML model is not susceptible to masking of degradations. This verifiable certification enables the trained MML model to satisfy standards for deployment to safety critical applications.

Figure 3:
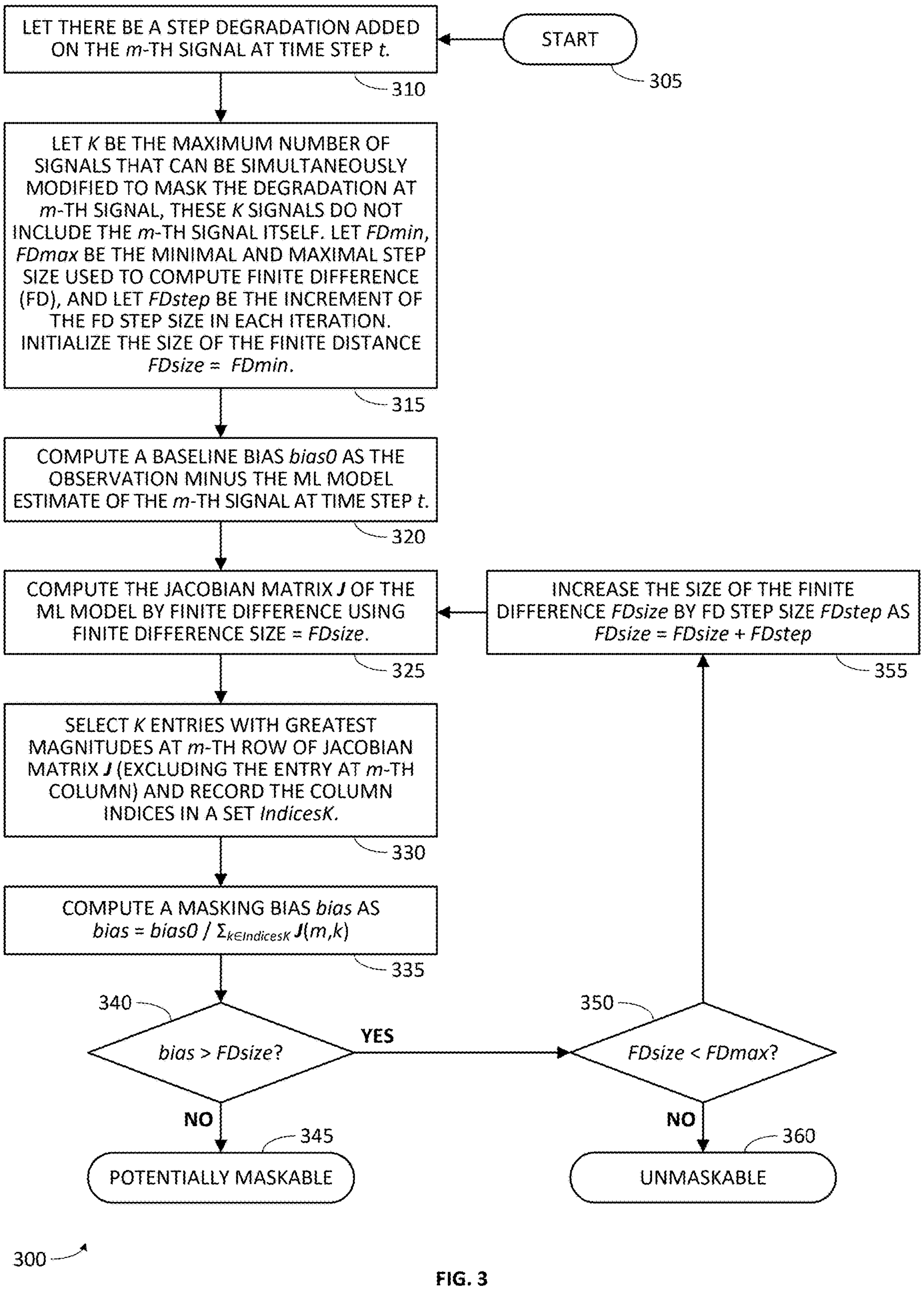
FIG. 3 illustrates another embodiment of a masking certification method incorporating a loop for analyzing using matrixes generated using differing perturbation values, the method being associated with ensuring that detection of degraded signals is not able to be masked by degradation in other signals.

FIG. 3 illustrates another embodiment of a masking certification method 300 incorporating a loop for analyzing using matrixes generated using differing perturbation values. The masking certification method 300 is associated with ensuring that detection of degraded signals is not able to be masked by degradation in other signals. Masking certification method 300 shows an iteration of an analysis to determine a degradation on an m-th signal to be either potentially maskable or unmaskable. Masking certification method 300 may be repeated for multiple (or all) M signals in the set of time series signals, including for pre-selected signals of interest among the M signals.

In one embodiment, masking certification method 300 initiates at START block 305 in response to satisfaction of one or more conditions similar to the conditions described above for commencing masking certification method 200. In one embodiment, a computing system configured by computer-executable instructions to execute functions of masking certification system 100 executes masking certification method 300.

At block 310 masking certification method 300 adds a step degradation on the m-th signal at time step t. The step degradation that causes a discrete jump in value of the m-th signal at time step t. At block 315, masking certification method 300 initializes several variables. Masking certification method 300 sets K to be a maximum number of signals that can be simultaneously modified to mask the degradation at the m-th signal. The K signals are other signals exclusive of the m-th signal. Masking certification method 300 sets FDmin to be a minimum, or initial size of the finite difference FDsize. Masking certification method 300 sets FDmax to be a maximum, or size cap for the finite difference FDsize. Masking certification method 300 sets FDstep to be an increment by which the finite difference FDsize is increased from FDmin toward FDmax in each iteration of the loop discussed below. Masking certification method 300 initializes the finite difference FDsize to be the minimum size FDmin. At block 320, masking certification method 300 computes a baseline bias bias0. The baseline bias bias0 is found by subtracting the observed value of the m-th signal for time t from the MML model estimate of the degraded m-th signal for time t.

In one embodiment, masking certification method 300 analyzes varied magnitudes of finite difference (perturbation) when generating the Jacobian matrix, thereby ensuring that a conclusion of un-maskability is supported by rigorous demonstration. For example, masking certification method 200 further analyzes the maskability of the difference over a range of finite difference (perturbation) sizes so as to confirm that the degradation is unmaskable from an alarm condition of the trained MML model. And, for example, masking certification method 200 may repeatedly increase the finite difference by an increment, repeating the generation of the Jacobian matrix (see block 225), determination of the masking bias (see block 230), and comparison of the masking bias and the finite difference (see block 235) for each updated value of the finite difference. In the following blocks 325-360, masking certification method 300 performs a loop for analyzing whether a degradation on a given (m-th) signal is potentially maskable or un-maskable using Jacobian matrixes generated with gradually increasing levels of perturbation.

At block 325, masking certification method 300 computes the Jacobian matrix of the trained MML model using a perturbation that is the current size of the finite difference FDsize (for example as discussed above at block 225). At block 330, masking certification method 300 selects K entries (other than the entry for the m-th signal) that have greatest magnitudes in the m-th row of the Jacobian matrix (for example as discussed above at block 230). At block 335, masking certification method 300 computes a masking bias bias from the baseline bias bias0 and the combined K entries (for example as discussed above at block 230).

At decision block 340, masking certification method 300 determines whether the masking bias bias exceeds the current size of the finite difference FDsize. If not (340: NO), masking certification proceeds to end block 345. If so, (340: YES), masking certification proceeds to decision block 350. At END block 345, masking certification method 300 certifies the degradation as potentially maskable to the trained MML model's alarm condition for the m-th signal, and concludes the masking certification analysis. At decision block 350, masking certification method 300 determines whether the current size of the finite difference FDsize is less than the size cap to be a maximum, or size cap for the finite difference. If so, (350: YES), masking certification proceeds to block 355. If not (350: NO), masking certification proceeds to end block 360. At block 355, masking certification method 300 increments the size of the finite difference FDsize by the step size FDstep. At END block 360, masking certification method 300 certifies the degradation as unmaskable to the trained MML model's alarm condition for the m-th signal, and concludes the masking certification analysis.

—Example Features of Masking Certification Techniques—

In one embodiment, masking certification method 200 further includes detecting, by the comparison (discussed above at blocks 235 and 340), that the masking bias does not exceed the finite difference (or, the finite difference exceeds the masking bias). And, in response to the masking bias not exceeding the finite difference (or, the finite difference exceeding the masking bias), generating the electronic alert (discussed above at block 235) further includes indicating in the electronic alert that the degradation on the m-th signal is potentially maskable, for example by K other time series signals in the set that correspond to the next K largest entries.

In one embodiment, masking certification method 200 further includes steps for evaluating the maskability of the difference over a range of finite difference perturbations to confirm that the degradation is unmaskable. Masking certification method 200 further includes incrementing the finite difference by a step until a cutoff threshold is satisfied, for example as discussed with reference to blocks 315, 350 and 355. For each increment to the finite difference, masking certification method 200 further includes generating the Jacobian matrix and determining the masking bias, for example as discussed above at blocks 225 and 230, respectively. Masking certification method 200 further includes detecting, by the comparison (discussed above at blocks 235 and 340), that the finite difference is less than the masking bias (or, that the masking bias is greater than the finite difference) for each increment of the finite difference. And, in response to the finite difference being less than the masking bias (or, the masking bias being greater than the finite difference) for each increment of the finite difference, generating the electronic alert (discussed above at block 235) further includes indicating in the electronic alert that the degradation on the m-th signal is un-maskable, for example by K other time series signals in the set that correspond to the next K largest entries.

In one embodiment, masking certification method 200 further includes detecting, by the comparison (discussed above at blocks 235 and 340), that the finite difference exceeds the masking bias. And, generating the electronic alert further includes, in response to the finite difference exceeding the masking bias, indicating in the electronic alert that the degradation on the m-th signal is potentially maskable.

In one embodiment, masking certification method 200 repeats, for multiple signals of the set of time series signals, steps for evaluating whether degradations are unmaskable or not. For multiple values of m between 1 and the M total time series signals in the set, masking certification method 200 generates the test observation (see block 215), determines the baseline bias (see block 220), generates the Jacobian matrix (see block 225), and determines the masking bias (see block 230). Then, in one embodiment, when generating the electronic alert (see block 235), masking certification method 200 further indicates in the electronic alert that degradation is un-maskable for the multiple values of m.

In one embodiment, masking certification method 200 generates the test observation (see block 215) by accessing a pre-specified value for the degradation that is a maximum acceptable amount of degradation for the m-th signal, and then adding the pre-specified value to an observed value for the m-th signal to generate the test observation.

In one embodiment, K is a threshold number of signals for which individual alarms on the signals will trigger a general alarm, thereby ensuring that degradation on K or more signals will trigger an alarm, regardless of whether they mask degradation on another signal such as the m-th signal. In one embodiment, the value of K may be pre-specified, and retrieved from storage. In one embodiment, masking certification method 200 may automatically derive the value of K by increasing K until the masking bias is approximately equal to the finite difference.

In one embodiment, the multivariate machine learning model is a multivariate state estimation technique (MSET) model. In one embodiment, the multivariate machine learning model is deterministic, that is, based on deterministic relationships between inputs and outputs. Accordingly, in one embodiment, the multivariate machine learning model is not stochastic, such as a neural network.

In one embodiment, masking certification method 200 further includes steps for detecting anomalies in the set of time series signals (for example, in further observations at time indices other than those used for testing). Masking certification method 200 monitors the set of time series signals with the trained multivariate machine learning model. Masking certification method 200 detects an anomaly in the set of time series signals based on a difference between further observations of the signals and further estimates of the observations by the trained multivariate machine learning model. And, masking certification method 200 generates an additional electronic alert that the anomaly is detected.

In one embodiment, masking certification method 200 repeatedly increments the finite difference by a step. Masking certification method 200 determines the masking bias for each incrementing of the finite difference. And, masking certification method 200 certifies the degradation by indicating the m-th signal to be (a) unmaskable where the comparison (see block 235) shows masking bias to exceed the finite difference for all increments of the finite difference, and (b) potentially maskable where the comparison shows the finite difference to exceed the masking bias for any increment of the finite difference.

In one embodiment, masking certification method 200 further certifies whether or not the degradation is un-maskable for values of m covering all time series signals in the set.

In one embodiment, masking certification method 200 further initially trains the multivariate ML model on a training range of the set of time series signals, wherein the training configures the multivariate ML model to generate, as outputs, estimates of individual variables based on the values provided as inputs for other variables, wherein the estimates are consistent with nominal operation of an asset that is monitored by the set of time series signals (for example as discussed below under the heading "Overview of Multivariate ML and Anomaly Detection").

In one embodiment, one or more non-transitory computer-readable media are provided that include stored thereon computer-executable instructions that, when executed by at least a processor of a computing system, cause the computing system to execute masking certification method 200.

In one embodiment, computing system, comprises at least one processor connected to at least one memory; and one or more non-transitory computer-readable media that include stored thereon computer-executable instructions that when executed by at least a processor of the computing system cause the computing system to execute masking certification method 200.

In one embodiment, the system further comprising one or more sensors configured to generate the set of time series signals from physical phenomena sensed from an asset.

—Context and Discussion of Masking Certification—

In one embodiment, the masking certification system 100 is configured to detect (or certify the absence of) the conditions under which real degradation in one signal could potentially be masked by combined degradations in other signals. In one embodiment, masking certification system 100 is capable of performing this POU analysis for machine learning (ML) based anomaly detection algorithms that are deterministic.

Rigorous POU analyses are possible for "deterministic" ML algorithms such as MSET (including Oracle's MSET2), auto-associative kernel regression, logistic regression, and linear regression models. In one embodiment, masking certification system 100 operates within a novel and rigorous framework for (1) proving the capability for POU analysis for ML prognostic algorithmics that are based upon deterministic math, for widely varying collections of monitored sensor signals, with any combinations of signal-to-noise ratios for the sensors, and (2) which precisely defines (and detects) conditions under which ML algorithms do not benefit from this capability—e.g., if an asset has 100 sensors, and 99 sensors are showing real anomaly alarms, it is not meaningful to prove that the one sensor without an anomaly might interfere with the obvious fact that the asset is in serious trouble. Thus, in one embodiment, masking certification system 100 can systematically and rigorously prove that "alarm masking" is mathematically impossible for applications of deterministic MML models under all meaningful alarm scenarios. And, in one embodiment, masking certification system 100 can additionally set rules accordingly to prevent the monitoring system falling into such conditions where the value of this invention would not be worthwhile. For example, if a preponderous fraction of the sensors are all in agreement that the system is degraded, the asset needs to be shut down and no additional POU analyses will give any added benefit.

In one embodiment, the masking certification system analyze the conditions when the degradation in one signal could potentially be masked by combined degradations in other signals for ML-based anomaly detection algorithms. In one embodiment, the masking certification system introduces a comprehensive parametric iterative approach that explores many configurations of degradation contamination on each "other" signal. For example, for the N−1 signals in a collection of N signals, excluding the one signal that has a known, deliberately introduced degradation and is showing alarms for that signal, performing one-at-a-time analyses with the remaining N−1 signals to prove there are no conditions in which disturbances on the other individual signals can possibly mask the alarms on the signal containing the known degradation.

Then, for example, for the N−1 signals, the signals are considered in combinations of two-at-a-time (all binary permutations), and so forth.

Eventually, a point is reached wherein if the vast majority of the N−1 other signals were to simultaneously become degraded, there remain too few "good" signals with which to perform signal predictions, and all signals could be issuing alarms. However, in this case there is no possibility of an asset continuing to operate with an absence of alarms. Hence, "Propagation-of-Uncertainty" is leveraged to exhaustively prove that there are no conditions—when using a deterministic mathematical ML algorithm (such as MSET)—in which a dangerous condition could exist while the alarms for that condition are masked. Such un-maskability removes the possibility for an asset to enter dangerous and possibly catastrophic failure conditions with no alarms to operators or autonomous safety actuation mechanisms to terminate or avoid a possibly safety-critical accident scenario.

As discussed below under the heading "Empirical Proof", the basic "un-maskability" proof for deterministic multivariate ML is demonstrated for the most challenging case: one degraded signal that satisfies one alarm condition. In the proof, permutations of degradation are introduced in the remaining N−1 signals, showing that there are no permutations of degradation in the remaining signals that can mask the alarm without at least triggering other alarms. The un-maskability proof may be extended to the (less challenging) cases where there might be 2 signals degraded and showing alarms, 3 signals, 4 signals, . . . up to K signals.

Use cases with 2 or more signals are less challenging, because it is mathematically less probable that any combination of noise or dynamics on any other signal or combination of signals can possibly mask 2, 3, 4, etc. signals that are actually degraded and showing alarms. Because the probability of "masking alarms" decreases significantly for 2, 3, or more actually degraded and alarm signals, an upper limit "K" is defined where if the ML model is showing alarms on "K" signals, there is zero value in continuing with Propagation-of-Uncertainty computations, and a Global Asset Protection alarm is immediately actuated for the User to immediately initiate intervention actions (e.g. abort operations), because not only is it infinitesimally improbable that anomalies in undegraded signals could possibly "mask" alarms in "K" signals, it is 99.99% certain that the asset is degraded and needs to be shut down promptly. The conditions under which is not meaningful to prove that a sensor is not masked are precisely defined (and detected). In one embodiment, the system additionally sets rules accordingly to prevent the monitoring system from falling into conditions where the POU analyses described herein will give no added benefit.

There is a machine learning (ML) method for anomaly detection (such as MSET2), in which there are N time-series from N sensors input to the method, the method predicts an optimally estimated value for each series according to the received N−1 measurements from other sensors, and then checks if the true received signal at each sensor matches well with the prediction of it. If so, there are no anomalies; otherwise, there is an anomaly for such sensors and alarms are generated. (Such ML methods for anomaly detection are discussed herein in additional detail under the heading "Overview of Multivariate ML and Anomaly Detection").

As proved herein, if one or several of the N sensor measurements is degraded and gets flagged with an Alarm, it is impossible for the other measurements within any combination of some number "K" of the other sensors to change their values in any manner that could mask the degradation of that Alarmed degraded measurement, given "K" is not too large. Because if a certain fraction of the available sensors are all showing Alarm conditions, then the Asset needs to be shut down ASAP, and no POU analysis will be valuable when "K" is large, in one embodiment the system notifies the end User when the asset is in severe trouble and to bypass the POU analysis and take intervention actions. In one embodiment, if one or some fraction of sensors are getting Alarms from degradation, the mathematical impossibility for some other sensor, or combination of other sensors, to have any kind of uncertainty or "wiggles" that would mask real Alarms is rigorously proven. Additionally, for scenarios where the degradation of the asset is so great that some large number of sensors "K" are all alarming, in one embodiment the system bypasses the POU analysis and instantly alerts the user responsible for the Asset that intervention actions need to be actuated immediately. The maximal K is identified inherently. Consistent with the definition provided above, to "mask" means, via some value changes of other measurements, that an anomaly detection system might be "masked" from detecting the degradation in the degraded signals.

In one embodiment, the masking certification system uses (i) numerically computed partial derivatives with respect to all other signals as embodied in Jacobians and (ii) subsequent Taylor expansion approximations to linearize the non-linear relationship of the trained MML model's prediction for one measured sensor signal, with respect to the measurements from the other (N−1) sensors. In this way, the masking certification system explicitly computes and describes the requirements of the value changes for other signals to mask one degraded signal from being detected by the trained MML model, and empirically proves that the masking is impossible if the number of other signals allowed to change their values is under a specific constraint.

For example, a set of N=100 time series signals is used for demonstrations herein of various features of this invention. The systematic parametric coverage for 1-degraded signal, vs. 2 degraded signals, vs. 3, 4, etc., encounters no mathematical limitations. Indeed, the rigorous reliability proof framework associated with the masking certification system possesses a conservative quality in that the possibility of an "actually degraded" signal or combination of signals being masked by combinations of degradation on the remaining signals becomes less and less possible as the total number of signals continues to grow.

For example, in the overall 100 signals of the example, if one signal is degraded, and in total, less than 20 other signals are allowed to be altered to mask this degradation, then this masking is impossible. As mentioned before, although the basic "un-maskability" proof is demonstrable for the most challenging case of one degraded signal with one Alarm condition, this property holds for additional (up to an upper limit "K") degraded signals because the probability of "masking alarms" decreases significantly for 2, 3, or more actually degraded and alarm signals. An upper limit "K" is defined where if the ML model is showing alarms on "K" signals, there is effectively zero value in continuing with POU computations to determine whether another signal that has no alarm is being masked. Instead, a Global Asset Protection alarm is immediately actuated that automatically actuates (or warns the user to for the user to immediately initiate) intervention actions, such as abort operations, because not only is the chance almost nonexistent that anomalies in undegraded signals could "mask" alarms in "K" signals, but where there are alarms on "K" signals, the system is 99.99% certain that the Asset is degraded and must be shut down as soon as possible.

The POU analysis performed by the systems, methods, and other embodiments for masking certification is the only known approach to analyze whether degradation in one signal is maskable by degradations in other signals. Where the trained MML model is of a deterministic mathematical character (such as is the case with MSET2), the masking certification system can apply a Jacobian-based propagation of uncertainty (POU) analysis to find out the conditions where one degradation can be masked by degradations from other signals. And, the masking calculation system can therefore set a rule accordingly to avoid the potential masking—in particular, setting a maximum number K of signals that may be in an alarm state, beyond which the Global Asset Protection alarm is triggered.

In contrast, POU analysis is not viable in the neural network (NN) based anomaly detection because of the random optimization of such schemes.

Discussing the example, more formally, let there be N=100 time series monitored by a trained MML model, in this case MSET2. At one time point, the input to MSET2 is the observation vector $x \in \mathbb{R}^N$ and the output is the estimation of this observation $e_a \in \mathbb{R}^N$. If at this time, there is one signal, e.g., signal #m, is subject to a degradation d, then the new estimation $e_b \in \mathbb{R}^N$ can be observed from the output of the MSET2 system, and can also be approximated using truncated Taylor expansion via the Jacobian matrix $J \in \mathbb{R}^{N\times N}$ as shown in EQ. 1:

$$e_b = \overbrace{\begin{bmatrix} e_{b1} \\ e_{b2} \\ \vdots \\ e_{bm} \\ \vdots \\ e_{bN} \end{bmatrix}}^{e_b} \approx \overbrace{\begin{bmatrix} e_{a1} \\ e_{a2} \\ \vdots \\ e_{am} \\ \vdots \\ e_{aN} \end{bmatrix}}^{e_a} + \overbrace{\begin{bmatrix} J_{1,1} & \cdots & J_{1,N} \\ J_{2,1} & \cdots & J_{2,N} \\ \vdots & \cdots & \vdots \\ J_{m,1} & \cdots & J_{m,N} \\ \vdots & \cdots & \vdots \\ J_{N,1} & \cdots & J_{N,N} \end{bmatrix}}^{J} \overbrace{\begin{bmatrix} x_1 \\ x_2 \\ \vdots \\ x_m + d \\ \vdots \\ x_N \end{bmatrix}}^{x} \quad \text{EQ. 1}$$

Here, for clarity, $e_a$ is the output vector from MSET2 where the inputs DO NOT include the degradation d on the m-th signal. And, $e_b$ is the output vector from MSET2 where inputs DO have the degradation m-th signal. Let the deviation from the observation of the degraded signal #m to its MSET2 estimation be defined as shown in EQ. 2:

$$bias0 = \text{observation} - \text{estimation} = x_m + d - e_{bm} \quad \text{EQ. 2}$$

Then, to mask the degradation on signal #m by adding degradations on other K signals (i.e., superimposing other degradation values on K entries of x other than its m-th entry), as shown in EQ. 3:

$$bias0 = \text{bias}_1 * J_{m,IndicesK(1)} + \text{bias}_2 * J_{m,IndicesK(2)} + \ldots + \text{bias}_k * J_{m,IndicesK(k)} \quad \text{EQ. 3}$$

where IndicesK is the set of the entries on which the $\text{bias}_1$, $\text{bias}_2$, . . . , $\text{bias}_k$ are added. By defining the vector bias $\in \mathbb{R}^{100}$ whose K entries in IndicesK have values $\text{bias}_1$, $\text{bias}_2$, . . . , $\text{bias}_k$ respectively and the other 100-K entries are 0, the Taylor expansion approximation gives (as shown in EQ. 4):

$$MSET(x + \text{bias}) \approx MSET(x) + J * \text{bias} \quad \text{EQ. 4}$$

Note: the "K" defined here does not include the assumed degraded signal (which in this initial illustration is signal #m here), so the number of all signals subjected to degradation is K+1.

In the example, a step change of 0.5 is superimposed onto signal #m=5, and no other signals are affected. At an example time t=1501, the observation minus estimate is 0.3988 for signal #m. So bias0=0.3988. The analysis by the masking certification system operates to add bias onto one or more other signals to increase the estimates so that for signal #m, observation minus estimate=0 at t=1501.

The masking certification system generates a numerical computed Jacobian matrix. The Jacobian matrix is computed by centered finite difference (FD). In this example, the Jacobian is computed with the perturbation or FD step size=10^−8:

Example—Adding Bias on One Signal Other than Signal #m

In a first example, the masking certification system adds a bias on 1 signal other than signal #m. The m-th row of Jacobian matrix J is a 1*100 vector in which the k-th entry is the derivative of the estimation of signal #m at t=1501 with respect to the input from signal #k.

The maximal absolute value of this vector (except its m-th entry) is the derivative of the largest magnitude. Adding a bias onto the input signal corresponding to this entry of largest magnitude to mask the degradation in signal #m at t=1501 permits the magnitude of the added bias to be smaller than the bias added on any other signal, since (as shown in EQ. 5):

$$bias0 = 0.3988 = \text{bias} \times J(m, i) \quad \text{EQ. 5}$$

as the magnitude of J(m,i) increases, the bias decreases.

Finding the entry of largest magnitude the m-th row of J (as shown in EQ. 6):

$$[val, ind] = \max(\text{abs}(J(m, i))) \quad \text{EQ. 6}$$

gives maximum magnitude value val=0.0942, and position index ind=46. Thus J(m,46)=+0.0942 is the maximal value on the m-th row of J.

However, the resulting masking bias is 0.3988/0.0942=4.2335, which remains too large for the Jacobian matrix J to be valid. (Note that, in this example, the MSET (x+bias)≈MSET (x)+J*bias is only valid for small bias). Adding 4.2335 to signal #46 will not essentially decrease the residual for signal #5 at t=1501:

In the above example, the Jacobian matrix J is computed numerically by finite difference with a very small step size 10^−8, but the bias=4.2335 is too far away from the step size. Considering that the amplitude of the signal is roughly between [−2, 2], the finite difference step size can be increased to make the derivatives in J applicable for larger biases. The maximum step size is therefore set to be 1.

Note, a wide variety of step sizes may be appropriate. For example, Jacobian matrix J is computed numerically by finite difference using various finite distance step sizes (step size=10^−8, 10^−7, 10^−6, 10^−5, 10^−4, 10^−3, 10^−2, 10^−1, 10^0). The 5th row of numerically computed Jacobian matrix J with various FD step sizes yields max=[0.0942, 0.0942, 0.0942, 0.0942, 0.0942, 0.0942, 0.0870, 0.0730, 0.0212] and maxInd (position index where the max is picked)=[46, 46, 46, 46, 46, 46, 46, 46, 52]. When using the step size=1 case, i.e., 10^0, then the largest magnitude appears at index 52 and has value+0.0212. As shown in EQ. 7):

$$bias0 = 0.3988 = \text{bias} \times 0.0212 \quad \text{EQ. 7}$$

the step size=1 case makes the masking bias=18.8549. This is far greater than the FD step size=1 and also out of the training range, and thus the derivative in the J (i.e., 0.0212) is still not applicable to be used in the Taylor expansion approximation.

Example—Adding Bias on Two Signals Other than Signal #m

In a second example, the masking certification system adds a bias on two signals other than signal #m. The two entries with largest magnitudes in abs (J (m,:)) (which is computed by FD using step size=10^−8) are at the column index 46 and 86, whose values are +0.0942 and +0.0809. Since (as shown in EQ. 8):

$$bias0 = 0.3988 = bias46 * 0.0942 + bias86 * 0.0809 \quad \text{EQ. 8}$$

the biases added on signal #46 (bias46) and on signal #86 (bias86) have infinite choices. The possible values for bias46 and bias86 are negatively related linearly. The smallest of the maximal magnitude for these biases is at bias46=bias86=2.2776. This bias is far from the FD step size 10^−8. By increasing the signal #46 and #86 by 2.2776, the residuals in Signal #5 are not essentially decreased (including at t=1501).

Similar to the modifying 1 signal case, the two-signal case may be modified to re-compute the Jacobian matrix J by FD using step size=1, instead of step size=10^−8. The entries with maximal magnitudes of this J are at 52 and 59, and whose values are +0.0212 and +0.0209.

Since (as shown in EQ. 9):

$$bias0 = 0.3988 = bias52 * 0.0212 + bias59 * 0.0209 \quad \text{EQ. 9}$$

as before, the minimal magnitude is chosen when the biases are the same, i.e., bias52=bias59=9.4738. This is far greater than the FD step size=1 and also out of the training range, and thus the derivatives in the J are still not applicable to be used in the Taylor expansion approximation.

Example—Adding Bias on Multiple Signals Other than Signal #m

From the previous discussion, note that for the K largest entries in J (m,:) whose indices are in "IndicesK" (assuming that values in these entries are all positive, which is valid for most cases), the bias added on these k signals may be set to be the same. The bias may be identified by solving (as shown in EQ. 10):

$$bias0 = 0.3988 = \text{bias} * \text{sum}(J(m, IndicesK)). \quad \text{EQ. 10}$$

Again, the Jacobian matrix J which is computed by FD with the step size=1 may be used, and again, the bias is constrained to be near the FD step size of 1. Increasing k from 3 to 4 to 5 and so on, the bias decreases. When k=25, bias=1.0398 is sufficiently close to 1 to satisfy the constraint. In this case, the IndicesK=[52, 59, 91, 47, 98, 19, 40, 82, 35, 75, 24, 13, 84, 33, 86, 85, 44, 36, 99, 23, 89, 43, 18, 30, 100] which are sorted by the descending order of the magnitudes of the corresponding entries in J(m,i).

So, adding bias=1.0398 to the 25 signals whose indices are in IndicesK, the residual at t=1501 for signal #m is decreased: observations (1501,m)−estimates (1501,m)=−0.0824.

As a comparison, adding a bias=1.0398 to 25 signals from #11 to #35 (i.e., not the IndicesK), the residual at t=1501 for Signal #m is not decreased as much as the previous case: observations (1501,m)−estimates (1501,m)=0.1351.

The 25 is the minimal required number of signals to be altered to mask the degradation in signal #m when the introduced bias is around 1. If a larger bias is allowed, the 25 may not be the minimal required number, but there is still another minimal required number of signals needing to be altered, as detailed below.

Process—Automatically Determine Value for K

In view of the examples and equations above, the masking certification system may operate to automatically determine a value for K. That is, masking certification system may determine how many signals (other than signal #m) is the minimum number needed to be able to mask the degradation in signal #m. In one embodiment, the masking certification system may iteratively increase K until the masking bias falls to within a constraint. The masking certification system will then set the final value of K to be the number of alarms which will trigger a global asset protection alarm. This ensures that should the number of degraded, alarm-triggering signals become large enough to actually cause masking of the m-th signal, a general alarm will be triggered that alerts the user to the possibility of masking and may initiate a shutdown of the asset.

In one embodiment, the masking bias is constrained to be approximately equal to the FD step size FDsize. For example, the constraint may be satisfied by a masking bias within 5% of FD step size FDsize. Where the FD step size FDsize=1, the masking bias satisfies the constraint within the range of 0.95 to 1.05. Wide ranges, such as within 10% of FD step size FDsize, may also be appropriate.

In one embodiment, adjustment to the size of K keeps the masking bias near the finite difference step size, ensuring that the Taylor expansion approximation holds. And, in one embodiment, where the masking bias is always higher than the FD step size FDsize for all increments of FDsize and corresponding increases in the value of K, the m-th signal is un-maskable.

—Empirical Proof—

Note, where it is possible to be masked in some way, there will exist a Jacobian that makes the Taylor expansion approximation applicable. (A Taylor expansion approximation is "applicable" where the linearization provided by terms of the Taylor series accurately represents a function at a given point.) Where, for all Jacobians computed for all possible FD step sizes FDsize ranging from minimum FD step size FDmin to maximum FD step size FDmax, none of the Jacobians can make the Taylor expansion approximation applicable indicates that the degradation is unmaskable. For a small K (e.g., K≤25), when the step for the finite difference increases, the magnitude of J (m, IndicesK) decreases in such a speed that guarantees that a bias satisfying the equation (as shown in EQ. 11):

$$bias0 = \text{bias} * \text{sum}(J(m, i)), \text{ for all } i \text{ within } IndicesK \quad \text{EQ. 11}$$

will always be far greater than the FD step size, making the Taylor expansion approximation inapplicable forever.

The average magnitude of the m-th row in the numerically computed Jacobian decreases as the finite difference step size used for computing the Jacobian increases.

As the number K of degraded signals increases, the bias which is required to be added on the K signals (other than signal #m) to mask the degradation at signal #m (with respect to the finite difference step for computing the Jacobian matrix) decreases. This is reasonable intuitively, as when bias is added on more signals, the magnitude for the bias added on each signal can be smaller to achieve the same cumulative "masking bias" effect to mask the degradation.

Where the masking bias is greater than the finite difference step size FDsize, the degradation masking cannot be achieved. Because although the Jacobian J and the bias satisfy EQ. 11, the MMLestimate(x+bias)−MMLestimate(x) is not equal to bias*sum (J(m, i)) for all i within IndicesK as the Taylor expansion approximation does not hold. The Taylor expansion approximation only holds when the masking bias is near the finite difference step size used for computing the Jacobian.

Where K=20, number of signals N=100, and the introduced bias on the m-th signal is 1, the finite difference step size FDsize and masking bias intersect near a value of 1.31, which is significantly in excess of the introduced bias.

Where K=25, number of signals N=100, and the introduced bias on the m-th signal is 1, the finite difference step size FDsize and masking bias intersect just above a value of 1, which still exceeds the introduced bias.

Overall, it is not viable to mask the degradation on signal #m by modifying only a small number of other signals, because the modifications become individually larger as the number K of modified signals shrinks. And conversely, as the bias on signal #m shrinks as a preponderance of the other signals become degraded, there is a vanishingly small probability that the asset will not be issuing a multitude of alarms. Accordingly, the masking certification system can certify that degradations are unmaskable for signal #m based on the K relatively few other signals. Thus, the masking certification system shows highly improved efficiency in terms of computing resources (such as processor time and memory) and speed over POU analyses that rely on a large proportion (or all of) the other signals.

Various Advantages

One threat to ML anomaly detection systems is degradation masking, during which multiple monitored time series experience degradations combine in a way that can "cheat the system", so that anomalous values on signals are suppressed and do not trigger an alarm. When such "cheating" happens, the ML anomaly detection system is not functioning effectively, and the monitored assets may suffer significant losses due to operational anomalies reflected in the degradations.

In one embodiment, the masking certification system improves the technology of ML anomaly detection by performing a novel method to determine whether this inadvertent cheating of the ML anomaly detection model is possible, and specify rules to avoid it (and under which rules the cheating may be proved systematically to be impossible). In one embodiment, the masking certification system frees the anomaly detection system from being cheated by the combination of degradations. This improves the accuracy of ML anomaly detection by reducing type I, "missed alarm probabilities", thereby avoiding dangerous condition that might otherwise get "masked" by some combination of degradations in other signals.

—Overview of Multivariate ML and Anomaly Detection—

Multivariate ML Models. In general, multivariate ML modeling techniques used for multivariate ML anomaly detection predict or estimate what each signal should be or is expected to be based on the other signals in a database or collection of time series signals. The predicted signal may be referred to as the "estimate". A multivariate ML anomaly detection model is used to make the predictions or estimates for individual variables based on the values provided for other variables. For example, for Signal 1 in a database of N signals, the multivariate ML anomaly detection model will compute an estimate for Signal 1 using signals 2 through N.

In one embodiment, the multivariate ML anomaly detection model may be a non-linear non-parametric (NLNP) regression algorithm used for multivariate anomaly detection. Such NLNP regression algorithms include auto-associative kernel regression (AAKR), and similarity-based modeling (SBM) such as the multivariate state estimation technique (MSET) (including Oracle's proprietary Multivariate State Estimation Technique (MSET2)). In one embodiment, the multivariate ML anomaly detection model may also be a multivariate linear regression model, or a multivariate logistic regression model.

In one embodiment, a multivariate ML model is trained to produce estimates of what the values of variables should be based on training with time series readings (such as time series signals) that represent normal, correct, or otherwise nominal operation of a monitored asset. The training process involves iteratively optimizing a configuration of the ML model until the ML model consistently predicts expected values for the training portion of the individual signal that match (within an acceptable tolerance) target values for the output of the ML model. The target values are a set of values of what the estimate is expected to be, given a particular set of inputs to the ML model.

To train the multivariate ML model, the target values and time series readings are used to adjust the ML model. In particular, a configuration of correlation patterns between the input variables of the ML model is automatically adjusted based on present values of the time series readings and the target values. The automatic adjustment causes the ML model to produce estimates from input values of the time series readings that approximate the target values within the acceptable tolerance, that is, with sufficient accuracy to satisfy a threshold for concluding that the ML model is trained. In one embodiment, sufficient accuracy of estimates to conclude the ML model is trained may be determined by residuals between estimates and target values for the respective variables being minimized below a pre-configured training threshold. A residual (as discussed above) is a difference between an actual value (such as a measured, observed, sampled, or resampled value) and an estimate, reference, or prediction of what the value is expected to be. At the completion of training, the ML state estimation model has inferred (learned) correlation patterns between variables.

Anomaly Detection. In one embodiment, the ML model may be used for detecting anomalous states of the time series readings. In one embodiment, the ML model is configured to generate estimated values for what each individual variable of a time series reading (observation) should be, based on present input of actual values for the other variables and prior training with target values for the variables from reference operation of an asset. The ML model so configured will therefore indicate what the values ought to be in a given moment, provided the asset is behaving normally. The estimates thus correspond to the inputs as pairs of actual and estimated values for the same set of variables. Here, the actual values of the training portion of the collection of time series signals are used as target values for training.

Following training, the ML model may be used to monitor time series readings for anomalous states. Subtracting an actual, measured value for each signal from a corresponding estimate gives the residuals (or differences) between the values of the signal and estimate. Where there is an anomaly in a signal, the measured signal value departs from the estimated signal value. This causes the residuals to increase, triggering an anomaly alarm. Thus, the residuals are used to detect such anomalies where one or more of the residuals indicates such a departure, for example by becoming consistently excessively large.

For example, the presence of an anomaly may be detected by a sequential probability ratio test (SPRT) analysis of the actual and estimated values for a signal. In one embodiment, the SPRT calculates a cumulative sum of the log-likelihood ratio for each successive residual between an actual value for a signal and an estimated value for the signal, and compares the cumulative sum against an alarm threshold value indicating anomalous deviation. Where the alarm threshold is crossed, an anomaly is detected, and an electronic alert indicating the anomaly may be generated.

—Electronic Alerts—

In one embodiment, an electronic alert may be generated and sent in response to a detection of an anomalous signal value. In one embodiment, an electronic alert is generated by composing and transmitting a computer-readable message. The electronic alert may be composed and then transmitted for subsequent presentation on a display or other action. In one embodiment, the computer readable message may be composed by populating a template data structure with content describing the anomaly. The computer readable message may include content describing an anomaly that triggered the alert, such as a timestamp or observation at which the anomaly was detected, an indication of the signal value that caused the anomaly, an identification of variable (in the multivariate set of variables) for which the anomaly occurred, and an asset under observation for which the alert is applicable.

In one embodiment, the electronic alert is a message that is configured to be transmitted over a network, such as a wired network, wi-fi network, or other communications infrastructure. The electronic alert may be configured to be read by a computing device. In one embodiment, the electronic alert may be presented in a user interface such as a user interface such as a graphical user interface (GUI) by extracting the content of the electronic alert by a REST API that has received the electronic alert. The GUI may present a message, notice, or other indication that the status of operation of a specific machine, asset component, or other signal source has entered (or left) an anomalous state of operation.

—Cloud or Enterprise Embodiments—

In one embodiment, the present system (such as masking certification system 100) is a computing/data processing system including a computing application or collection of distributed computing applications for access and use by other client computing devices that communicate with the present system over a network. In one embodiment, masking certification system 100 is a component of a time series data service that is configured to gather, serve, and execute operations on time series data. The applications and computing system may be configured to operate with or be implemented as a cloud-based network computing system, an infrastructure-as-a-service (IAAS), platform-as-a-service (PAAS), or software-as-a-service (SAAS) architecture, or other type of networked computing solution. In one embodiment the present system provides at least one or more of the functions disclosed herein and a graphical user interface to access and operate the functions. In one embodiment, masking certification system 100 is a centralized server-side application that provides at least the functions disclosed herein and that is accessed by many users by way of computing devices/terminals communicating with the computers of masking certification system 100 (functioning as one or more servers) over a computer network. In one embodiment masking certification system 100 may be implemented by a server or other computing device configured with hardware and software to implement the functions and features described herein.

In one embodiment, the components of masking certification system 100 may be implemented as sets of one or more software modules executed by one or more computing devices specially configured for such execution. In one embodiment, the components of masking certification system 100 are implemented on one or more hardware computing devices or hosts interconnected by a data network. For example, the components of masking certification system 100 may be executed by network-connected computing devices of one or more computing hardware shapes, such as central processing unit (CPU) or general-purpose shapes, dense input/output (I/O) shapes, graphics processing unit (GPU) shapes, and high-performance computing (HPC) shapes.

In one embodiment, the components of masking certification system 100 intercommunicate by electronic messages or signals. These electronic messages or signals may be configured as calls to functions or procedures that access the features or data of the component, such as for example application programming interface (API) calls. In one embodiment, these electronic messages or signals are sent between hosts in a format compatible with transmission control protocol/internet protocol (TCP/IP) or other computer networking protocol. Components of masking certification system 100 may (i) generate or compose an electronic message or signal configured to issue a command or request, or to carry other data, to another component, (ii) transmit the message or signal to other components of masking certification system 100, (iii) parse the content of an electronic message or signal received to identify commands or requests that the component can perform, or to extract transferred data, and (iv) in response to identifying the command, request, automatically perform or execute the command or request. The electronic messages or signals may include queries against databases. The queries may be composed and executed in query languages compatible with the database and executed in a runtime environment compatible with the query language.

In one embodiment, remote computing systems may access information or applications provided by masking certification system 100, for example through a web interface server. In one embodiment, the remote computing system may send requests to and receive responses from masking certification system 100. In one example, access to the information or applications may be effected through use of a web browser on a personal computer or mobile device. In one example, communications exchanged with masking certification system 100 may take the form of remote representational state transfer (REST) requests using JavaScript object notation (JSON) as the data interchange format for example, or simple object access protocol (SOAP) requests to and from XML servers. The REST or SOAP requests may include API calls to components of masking certification system 100.

—Software Module Embodiments—

In general, software instructions are designed to be executed by one or more suitably programmed processors accessing memory. Software instructions may include, for example, computer-executable code and source code that may be compiled into computer-executable code. These software instructions may also include instructions written in an interpreted programming language, such as a scripting language.

In a complex system, such instructions may be arranged into program modules with each such module performing a specific task, process, function, or operation. The entire set of modules may be controlled or coordinated in their operation by an operating system (OS) or other form of organizational platform.

In one embodiment, one or more of the components described herein are configured as modules stored in a non-transitory computer readable medium. The modules are configured with stored software instructions that when executed by at least a processor accessing memory or storage cause the computing device to perform the corresponding function(s) as described herein.

—Computing Device Embodiment—

Figure 4:
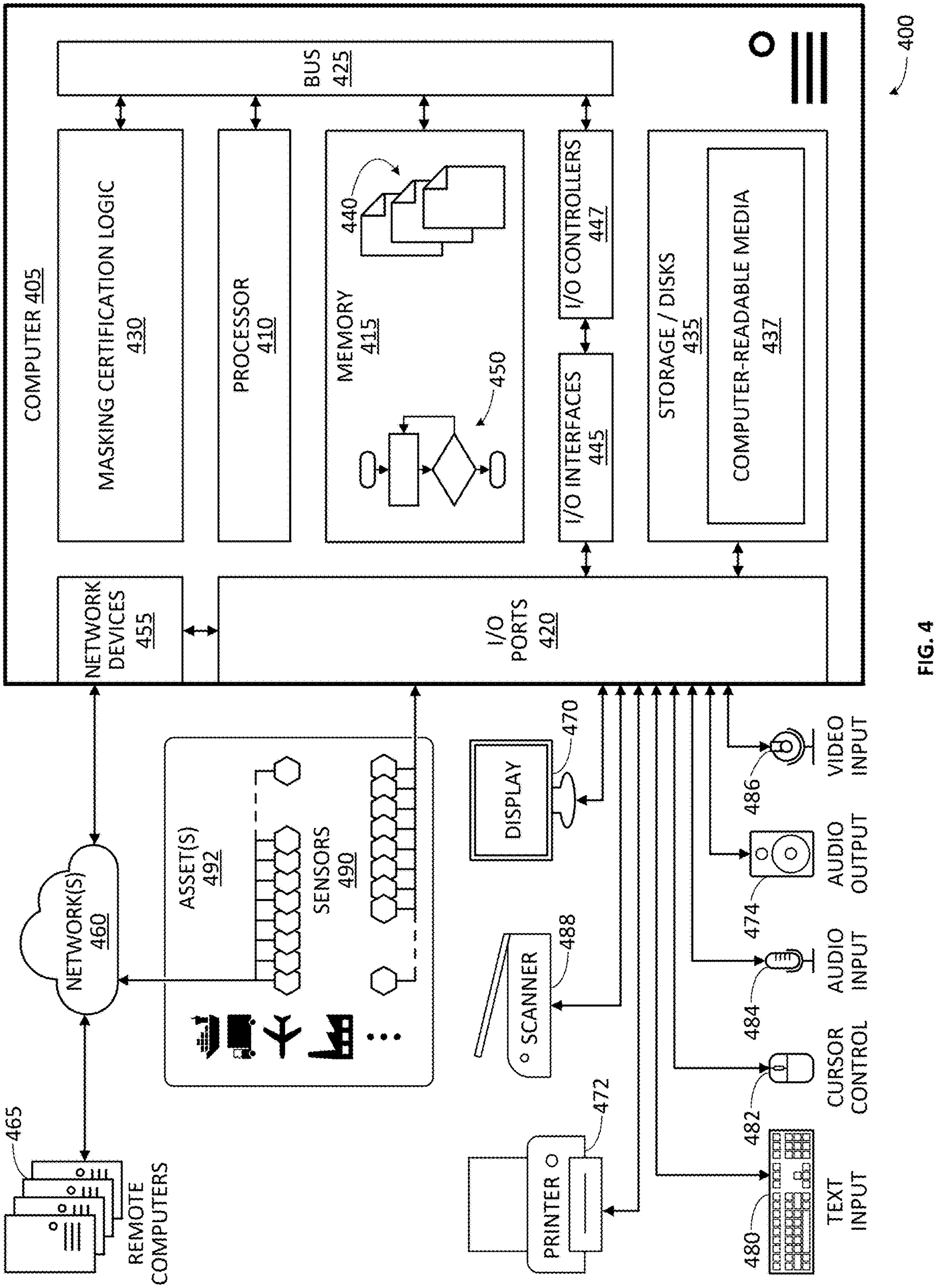
FIG. 4 illustrates an embodiment of a computing system configured with the example systems and/or methods disclosed.

FIG. 4 illustrates an example computing system 400 that is configured and/or programmed as a special purpose computing device(s) with one or more of the example systems and methods described herein, and/or equivalents. The example computing device may be a computer 405 that includes at least one hardware processor 410, a memory 415, and input/output ports 420 operably connected by a bus 425. In one example, the computer 405 may include masking certification logic 430 configured to facilitate ensuring that detection of degraded signals is not able to be masked by degradation in other signals, similar to the logic of the masking certification systems, methods, and other embodiments shown and described with reference to FIGS. 1, 2, and 3.

In different examples, the logic 430 may be implemented in hardware, one or more non-transitory computer-readable media 437 with stored instructions, firmware, and/or combinations thereof. While the logic 430 is illustrated as a hardware component attached to the bus 425, it is to be appreciated that in other embodiments, the logic 430 could be implemented in the processor 410, stored in memory 415, or stored in disk 435.

In one embodiment, logic 430 or the computer is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an application-specific integrated circuit (ASIC) programmed to facilitate ensuring that detection of degraded signals is not able to be masked by degradation in other signals. The means may also be implemented as stored computer executable instructions that are presented to computer 405 as data 440 that are temporarily stored in memory 415 and then executed by processor 410.

Logic 430 may also provide means (e.g., hardware, non-transitory computer-readable medium that stores executable instructions, firmware) for performing one or more of the disclosed functions and/or combinations of the functions.

Generally describing an example configuration of the computer 405, the processor 410 may be a variety of various processors including dual microprocessor and other multi-processor architectures. A memory 415 may include volatile memory and/or non-volatile memory. Non-volatile memory may include, for example, read-only memory (ROM), programmable ROM (PROM), and so on. Volatile memory may include, for example, random access memory (RAM), static RAM (SRAM), dynamic RAM (DRAM), and so on.

A storage disk 435 may be operably connected to the computer 405 via, for example, an input/output (I/O) interface 445 (e.g., card, device) and an input/output port 420 that are controlled by at least an input/output (I/O) controller 447. The disk 435 may be, for example, a magnetic disk drive, a solid-state drive, a floppy disk drive, a tape drive, a Zip drive, a flash memory card, a memory stick, and so on. Furthermore, the disk 435 may be a compact disc ROM (CD-ROM) drive, a CD recordable (CD-R) drive, a CD rewritable (CD-RW) drive, a digital video disc ROM (DVD ROM) drive, and so on. The storage/disks thus may include one or more non-transitory computer-readable media. The memory 415 can store a process 450 and/or a data 440, for example. The disk 435 and/or the memory 415 can store an operating system that controls and allocates resources of the computer 405.

The computer 405 may interact with, control, and/or be controlled by input/output (I/O) devices via the input/output (I/O) controller 447, the I/O interfaces 445, and the input/output ports 420. Input/output devices may include, for example, one or more network devices 455, displays 470, printers 472 (such as inkjet, laser, or 3D printers), audio output devices 474 (such as speakers or headphones), text input devices 480 (such as keyboards), cursor control devices 482 for pointing and selection inputs (such as mice, trackballs, touch screens, joysticks, pointing sticks, electronic styluses, electronic pen tablets), audio input devices 484 (such as microphones or external audio players), video input devices 486 (such as video and still cameras, or external video players), image scanners 488, video cards (not shown), disks 435, and so on. The input/output ports 420 may include, for example, serial ports, parallel ports, and USB ports.

The computer 405 can operate in a network environment and thus may be connected to the network devices 455 via the I/O interfaces 445, and/or the I/O ports 420. Through the network devices 455, the computer 405 may interact with a network 460. Through the network 460, the computer 405 may be logically connected to remote computers 465. Networks with which the computer 405 may interact include, but are not limited to, a local area network (LAN), a wide area network (WAN), and other networks.

In one embodiment, the computer 405 may be connected to sensors 490 through I/O ports 420 or networks 460 in order to receive information about physical states of monitored machines, devices, systems, facilities, or other apparatuses (collectively referred to as “assets” 492) and components thereof. The assets 492 generally include any type of device, machinery or facility with components that perform measurable activities. For example, an asset may be an aircraft, motor vehicle, ship, oil refinery, power plant, manufacturing facility, machine tool, computer server, or other system, as well as the various components of such systems such as an engine, motor, hydraulic system, turbine, furnace, pump, fan, or other components. In one embodiment, sensors 490 may be operably connected or affixed to assets 492 or otherwise configured to detect and physical phenomena occurring in or around the asset 492. The sensors 490 may produce time series signals of readings taken from the asset 492. The sensors 490 may be network-connected sensors. Assets 492 with network-connected sensors may be referred to as Internet of Things (IOT)-connected devices. The network connection of the sensors 490 and networks 460 may be wired or wireless.

In one embodiment, the sensors 490 include one or more vibration sensors, such as single- and/or multi-axial accelerometers, microphones, piezoelectric, or other vibration sensors that are configured to register physical vibration, such as mechanical oscillation, occurring in and around asset 492. In one embodiment, the sensors 490 may also include (but are not limited to): a temperature sensor (such as a thermocouple or resistive temperature detector), a voltage sensor, a current sensor, a pressure sensor, a rotational speed sensor, a flow meter sensor, a speedometer or other speed sensor, an airspeed sensor or anemometer, an electromagnetic radiation sensor such as an antenna, a proximity sensor, a gyroscope, an inclinometer, a global positioning system (GPS) sensor, a fuel gauge, a torque sensor, a flex sensor, a nuclear radiation detector, or any of a wide variety of other sensors or transducers for generating electrical signals that represent sensed physical phenomena, for example physical phenomena occurring in or around asset 492.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C. § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C. § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. One or more non-transitory computer-readable media that include stored thereon computer-executable instructions that when executed by at least one processor of a computing system cause the computing system to:

access a multivariate machine learning model that is trained to monitor a set of time series signals;

generate a test observation of the time series signals that includes a degradation on an m-th signal of the time series signals;

determine a baseline bias of the multivariate machine learning model for the m-th signal based on the test observation and an estimated value of the m-th signal that was produced by the multivariate machine learning model;

generate a Jacobian matrix of the multivariate machine learning model based on a finite difference;

determine a masking bias based on the baseline bias and a set of next K largest entries of an m-th row of the Jacobian matrix, wherein K is a threshold number of signals for which individual alarms on the signals trigger a general alarm; and generate an electronic alert that certifies whether or not the degradation in the m-th signal is un-maskable based on a comparison between the masking bias and the finite difference.

2. The non-transitory computer-readable media of claim 1, wherein the instructions further cause the computing system to:

detect, by the comparison, that the finite difference exceeds the masking bias; and wherein the instructions for generating the electronic alert further cause the computing system to, in response to the finite difference exceeding the masking bias, indicate in the electronic alert that the degradation on the m-th signal is potentially maskable by K other time series signals in the set of time series signals that correspond to the set of next K largest entries.

3. The non-transitory computer-readable media of claim 1, wherein the instructions further cause the computing system to:

increment the finite difference by a step until a cutoff threshold is satisfied;

for each increment of the finite difference, generate the Jacobian matrix and determine the masking bias;

detect, by the comparison, that the finite difference is less than the masking bias for each increment of the finite difference; and wherein the instructions to generate the electronic alert further cause the computing system to, in response to the finite difference being less than the masking bias for each increment of the finite difference, indicate in the electronic alert that the degradation on the m-th signal is un-maskable by K other time series signals in the set of time series signals that correspond to the set of next K largest entries.

4. The non-transitory computer-readable media of claim 3, wherein the instructions further cause the computing system to, for multiple values of m between 1 and N wherein N is a total number of time series signals in the set of time series signals, generate the test observation, determine the baseline bias, generate the Jacobian matrix, and determine the masking bias; and wherein the instructions to generate the electronic alert further cause the computing system to indicate in the electronic alert that the degradation is un-maskable for the multiple values of m.

5. The non-transitory computer-readable media of claim 1, wherein the instructions to generate the test observation further cause the computing system to:

access a pre-specified value for the degradation that is a maximum acceptable amount of degradation for the m-th signal; and add the pre-specified value to an observed value for the m-th signal to generate the test observation.

6. The non-transitory computer-readable media of claim 1, wherein the instructions further cause the computing system to increase K until the masking bias is approximately equal to the finite difference to automatically determine a value of K.

7. The non-transitory computer-readable media of claim 1, wherein the multivariate machine learning model is a multivariate state estimation technique (MSET) model.

8. A computer-implemented method, comprising:

accessing a multivariate machine learning model that is trained to monitor a set of time series signals;

accessing a test observation of the time series signals that includes a degradation on an m-th signal of the time series signals;

determining a baseline bias of the multivariate machine learning model for the m-th signal based on the test observation and an estimated value of the m-th signal that was produced by the multivariate machine learning model;

generating a Jacobian matrix of the multivariate machine learning model based on a finite difference that is smaller in magnitude than an observed value of the m-th signal;

determining a masking bias based on the baseline bias and a set of next K largest entries of an m-th row of the Jacobian matrix, wherein K is a threshold number of signals for which individual alarms on the signals trigger a general alarm; and generating an electronic alert that certifies whether or not the degradation in the m-th signal is un-maskable based on a comparison between the masking bias and the finite difference.

9. The computer-implemented method of claim 8, further comprising:

detecting, by the comparison, that the finite difference exceeds the masking bias; and wherein generating the electronic alert further comprises, in response to the finite difference exceeding the masking bias, indicating in the electronic alert that the degradation on the m-th signal is potentially maskable.

10. The computer-implemented method of claim 8, further comprising:

incrementing the finite difference by a step until a cutoff threshold is satisfied;

repeating the steps for generating the Jacobian matrix and determining the masking bias for a plurality of increments to the finite difference;

detecting, by the comparison, that the masking bias is greater than the finite difference for the plurality of increments of the finite difference; and wherein generating the electronic alert further comprises, in response to the masking bias being greater than the finite difference for the plurality of increments of the finite difference, indicating in the electronic alert that the degradation on the m-th signal is un-maskable.

11. The computer-implemented method of claim 8, further comprising repeating, for multiple values of m between 1 and N, the steps of accessing the test observation, determining the baseline bias, generating the Jacobian matrix, and determining the masking bias, wherein N is a total number of time series signals in the set of time series signals, and wherein m is an index that identifies one time series signal in the set of time series signals.

12. The computer-implemented method of claim 8, further comprising generating the test observation by:

accessing a pre-specified value for the degradation that is a maximum acceptable amount of degradation for the m-th signal; and adding the pre-specified value to an observed value for the m-th signal to generate the test observation.

13. The computer-implemented method of claim 8, further comprising increasing K until the masking bias is approximately equal to the finite difference to automatically determine a value of K.

14. The computer-implemented method of claim 8, wherein the multivariate machine learning model is deterministic.

15. The computer-implemented method of claim 8, further comprising:

monitoring the set of time series signals with the multivariate machine learning model;

detecting an anomaly in the set of time series signals based on a difference between further observations of the time series signals and further estimates of the further observations by the multivariate machine learning model; and generating an additional electronic alert that the anomaly is detected.

16. A computing system, comprising:

one or more processors connected to at least one memory; and one or more non-transitory computer-readable media that include stored thereon computer-executable instructions that when executed by at the one or more processors of the computing system cause the computing system to:

generate a test observation of a set of signals that includes a degradation on one signal;

determine a baseline bias of a multivariate machine learning model using the test observation;

determine a masking bias based on the baseline bias and a plurality of inputs to the multivariate machine learning model;

compare the masking bias and a finite difference; and certify the degradation to be (a) potentially maskable where the finite difference exceeds the masking bias, and (b) un-maskable where the masking bias exceeds the finite difference.

17. The computing system of claim 16, wherein the instructions further cause the computing system to:

repeatedly increment the finite difference by a step; and determine the masking bias and certify the degradation for each increment of the finite difference.

18. The computing system of claim 16, wherein the instructions further cause the computing system to certify whether or not the degradation is un-maskable for all signals in the set of signals.

19. The non-transitory computer-readable media of claim 1, wherein the multivariate machine learning model is not stochastic.

20. The computing system of claim 16, further comprising one or more sensors configured to generate the set of signals from physical phenomena sensed from an asset.

* * * * *